United States Patent Office 3,398,178
Patented Aug. 20, 1968

---

3,398,178
POLYMERIZATION OF SILACYCLOBUTANES
Lee E. Nelson, Midland, Mich., assignor to Dow Corning Corporation, Midland, Mich., a corporation of Michigan
No Drawing. Filed June 21, 1965, Ser. No. 465,725
4 Claims. (Cl. 260—448.2)

ABSTRACT OF THE DISCLOSURE

A method of polymerizing silacyclobutanes to form

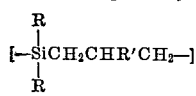

units useful as fluids, resins, and elastomers. An illustrative example being:

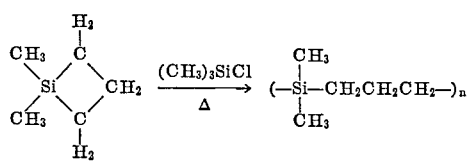

---

This invention relates to the polymerization of silacyclobutanes to form fluids and gums.

Silacyclobutanes are known compounds which can generally be prepared by the following reaction:

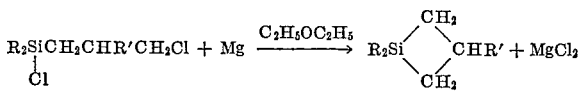

where R is a methyl or a phenyl radical, and R' is a methyl radical or a hydrogen atom. Heating is generally not required, although the reaction often requires initiation with a trace of methyl iodide.

By the above reaction, silacyclobutanes such as 1,1-dimethyl-1-silacyclobutane; 1,3-dimethyl-1-phenyl-1-silacyclobutane; and 1,1,3-trimethyl-1-silacyclobtane can be formed.

This invention relates to a method of polymerizing (a) at least one compound of the formula

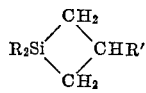

comprising contacting said compound under substantially anhydrous conditions with (b) a catalytic amount of a compound selected from the group consisting of $R''_mX_nSiH_{4-m-n}$, $AlX_3$, and $HX$, where R is a methyl or a phenyl radical,
R' is a methyl radical or a hydrogen atom,
R'' is a radical selected from the group consisting of monovalent hydrocarbon and halohydrocarbon radicals free of aliphatic unsaturation,
X is a halogen atom having an atomic number higher than fluorine,
m has a value of 0 to 3, and
n has a value of 1 to 4,
m+n being from 3 to 4, whereby a polymer consisting essentially of

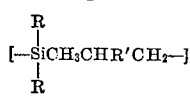

units is formed.

R'' can be any monovalent hydrocarbon radical free of aliphatic unsaturation, e.g. any alkyl or cycloalkyl radical such as methyl, ethyl, propyl, isohexyl, octadecyl, cyclohexyl, or cyclopentyl; and aryl-containing radicals such as phenyl, tolyl, benzyl, xenyl, and naphthyl. R'' can also be any monovalent halohydrocarbon radical, free of aliphatic unsaturation, such as chloropropyl, 3,3,3-trifluoropropyl, bromodecyl, chlorocyclohexyl, bromophenyl, α,α,α-trifluorotolyl, and chloronaphthyl.

Ingredient (b), therefore, can be any silane of the above definition such as trimethylchlorosilane, ethylmethyldichlorosilane, methylisohexyldibromosilane, chlorophenyltrichlorosilane, tolyltrichlorosilane, 3,3,3-trifluoropropylmethyldichlorosilane, cyclohexyldimethylbromosilane, and chlorocyclopentyltrichlorosilane. Ingredient (b) can also be a hydrohalic acid, e.g. HCl or HBr; or an aluminum halide such as aluminum chloride or iodide.

It is preferred for from 0.1 to 100 weight percent of ingredient (b) to be present, based on the weight of ingredient (a), but other proportions can also be operative.

The reaction temperature is likewise not critical, but it is preferred to run the reaction from 80° to 150° C. in order to get a rapid reaction rate. The reaction proceeds at temperatures below the decomposition temperature of the product.

By "substantially anhydrous conditions" it is meant that water must not be added to the reaction mixture. The small amounts of water found in the air, etc. can be tolerated by the reaction.

It is preferred for R'' to be a lower alkyl radical and for X to be chlorine.

The polymers and copolymers made by the process of this invention are useful as fluids, resins, and elastomers. Copolymers can be made by polymerizing a mixture of ingredients (a).

The following examples are illustrative only and should not be construed as limiting the invention, which is properly delineated in the appended claims.

Example 1

A solution of 1.3 g. of 1,1-dimethyl-1-silacyclobutane and 0.08 g. of trimethylchlorosilane was sealed and heated in a Pyrex glass tube at 100° C. for 23 hours.

A benzene-soluble polymer consisting of

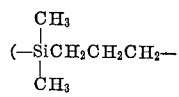

units was formed. Upon removal of impurities by evaporation in a vacuum, the polymer product formed a hard film.

Example 2

A solution of 0.3553 g. of the silacyclobutane of Example 1 and 0.0507 g. of dimethyldichlorosilane was sealed in a Pyrez glass tube and heated for 3 hours at 100° C.

A product similar to that of Example 1 was recovered.

Example 3

A solution of 0.3200 g. of the silacyclobutane of Example 1 and 0.4797 g. of methyltrichlorosilane was sealed in a Pyrex glass tube and heated for 3 hours at 100° C.

A product similar to that of Example 1 was recovered. None of the silacyclobutane remained unreacted.

Example 4

To 0.4 g. of the silacyclobutane of Example 1 there was added 0.1 cc. of a saturated solution of anhydrous HCl in benzene. The container was sealed and heated at 100° C. for 3 hours to yield a product similar to that of Example 1.

Example 5

To 0.2 g. of the silacyclobutane of Example 1 there was added one milligram of AlCl$_3$. The container was sealed and heated at 100° C. for 3 hours to yield a product similar to that of Example 1.

Example 6

When 1 g. of 1,3-dimethyl-1-phenyl-1-silacyclobutane is mixed with 0.5 g. of trichlorosilane, and heated at 90° C. for 4 hours, a polymer containing

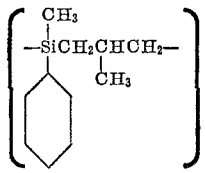

units is formed.

Example 7

When 1 g. of 1,1,3-trimethyl-1-silacyclobutane and 1 g. of 1,1-diphenyl-1-silacyclobutane is mixed with 0.02 g. of 3,3,3-trifluoropropylphenyldibromosilane and heated at 150° C. for 1 hour, a polymer containing

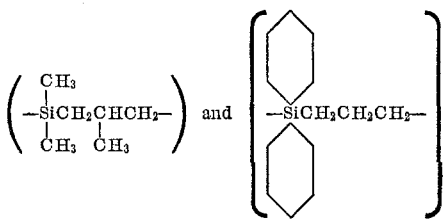

units is formed.

That which is claimed is:
1. A method of polymerizing
(a) at least one compound of the formula

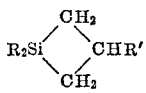

comprising contacting said compound under substantially anhydrous conditions with
(b) a catalytic amount of a compound selected from the group consisting of R″$_m$X$_n$SiH$_{4-m-n}$, AlX$_3$, and HX, where R is a methyl or phenyl radical,
R' is a methyl radical or a hydrogen atom,
R″ is a radical selected from the group consisting of monovalent hydrocarbon and halohydrocarbon radicals free of aliphatic unsaturation,
X is a halogen atom having an atomic number higher than fluorine,
m has a value of 0 to 3, and
n has a value of 1 to 4,
m+n being from 3 to 4, whereby a polymer consisting essentially of

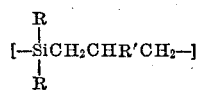

units is formed.

2. The process of claim 1 where (b) is R″$_m$X$_{3-m}$SiH, where R″ is a lower alkyl radical, X is a halogen atom with an atomic number higher than fluorine, and m has a value of 0–3.

3. The process of claim 1 where (b) is AlCl$_3$.
4. The process of claim 1 where (b) is HCl.

References Cited

UNITED STATES PATENTS 2,774,779  12/1956  Gilkey.
2,850,514  9/1958  Knoth.
3,046,291  7/1962  Sommer.

HELEN M. McCARTHY, *Primary Examiner.*
P. F. SHAVER, *Assistant Examiner.*